United States Patent [19]
Bergkvist, Jr. et al.

[11] Patent Number: 5,459,849
[45] Date of Patent: Oct. 17, 1995

[54] METHOD AND APPARATUS FOR COMPRESSING CACHEABLE DATA

[75] Inventors: John J. Bergkvist, Jr.; Michael J. Peters, both of Underhill; Daniel M. Wronski, Essex Junction, all of Vt.

[73] Assignee: International Business Machines Corporation, Armonk, N.Y.

[21] Appl. No.: 739,922

[22] Filed: Aug. 2, 1991

[51] Int. Cl.$^6$ .................................................. G06F 12/00
[52] U.S. Cl. .................. 395/403; 364/260.6; 364/939.7; 395/250; 395/445
[58] Field of Search .................. 364/200 MS File, 364/900 MS File; 395/400 MS, 425 MS

[56] References Cited

U.S. PATENT DOCUMENTS

| | | | |
|---|---|---|---|
| 4,136,386 | 1/1979 | Annunziata et al. | 364/200 |
| 4,313,158 | 1/1982 | Porter et al. | 364/200 |
| 4,677,550 | 6/1987 | Ferguson | 395/600 |
| 4,742,446 | 5/1988 | Morioka et al. | 364/200 |
| 4,811,203 | 3/1989 | Hamstra | 364/200 |
| 4,823,259 | 4/1989 | Aichelmann, Jr. et al. | 364/200 |
| 4,858,111 | 8/1989 | Steps | 364/200 |
| 5,019,965 | 5/1991 | Webb, Jr. et al. | 364/200 |
| 5,155,843 | 10/1992 | Stamm et al. | 364/200 |
| 5,222,223 | 6/1993 | Webb, Jr. et al. | 364/200 |
| 5,241,638 | 8/1993 | Mork et al. | 364/400 |
| 5,327,541 | 7/1994 | Reinecke et al. | 395/400 |

OTHER PUBLICATIONS

IBM Technical Disclosure Bulletin, vol. 25, No. 9, Feb. 1983.

Primary Examiner—Reba I. Elmore
Attorney, Agent, or Firm—Heslin & Rothenberg

[57] ABSTRACT

A method and apparatus for compressing cacheable data stored in one or more write back buffers is described herein. A cacheable data element includes an address component, a data component and a byte enable component. Generally, the method includes comparing the address component of a first cacheable data element stored in a first write back buffer with the address component of a second cacheable data element. This second cacheable data element may be an incoming data element from the processor or a data element stored in a second write back buffer. If the two address components are equal, then compression is performed. In one implementation, compression is performed by overlaying the data component of the first cacheable data element with the data component of the second cacheable data element resulting in a compressed data component. In addition, the byte enable component of the first cacheable data element and the byte enable component of the second cacheable data element are combined resulting in a combined byte enable component. The combined byte enable component indicates which bits of the compressed data component are valid.

27 Claims, 5 Drawing Sheets fig. 1 (PRIOR ART)

fig. 2 fig. 3 fig. 5 fig. 6 fig. 7

METHOD AND APPARATUS FOR COMPRESSING CACHEABLE DATA

BACKGROUND OF THE INVENTION

1. Technical Field

The present invention relates in general to a computer system having a cache memory and write back buffers and, more particularly, to an apparatus and method for compressing cacheable data stored in one or more write back buffers.

2. Background of the Art

A computer system typically includes a processor and memory. When the processor can operate at a faster speed than the memory, then read/write operations to the memory can slow down the processor and degrade system performance. In order to enhance system performance, a cache memory and write back buffers are added to the computer system. A cache memory is a short-term, high-speed, high capacity computer memory. The processor simultaneously writes data to the cache memory and one write back buffer. Once the data is written to the cache memory and write back buffers, the processor may continue processing while the data is eventually written out to memory. At times, the processor may perform a number of write memory operations in a row such that all of the write back buffers become full. Should this happen the processor stalls until data can be written to memory. The number of write back buffers used is restricted due to a trade-off in space available for additional write back buffers versus the system performance gained with each additional buffer.

There have been attempts in the past to enhance system performance by providing a faster method of storing data in the memory. For example, one or more write back buffers have been used to minimize process stalls due to write operations. However, with this method, system utilization remains the same since write operations are merely delayed and not compressed. Further, in prior art systems, the write back buffer unit consisted of an address register to hold the address where the data was to be stored, byte enables to identify which parts of the data were valid for storing at the memory address, and a register or buffer to hold the data. However, in prior art devices it is still necessary to transfer all the bits of data to main memory even when some of the bits of data are no longer needed.

One example of a prior art attempt to enhance system performance is described in U.S. Pat. No. 4,742,446 entitled, "Computer System Using Cache Buffer Storage Unit and Independent Storage Buffer Device for Store Through Operation". This patent discloses an apparatus which enables the packing of sequential writes of sequential data for efficient transfer to main memory. However, it does not permit the packing of non-sequential writes for efficient transfer to main memory. Therefore, when there are several non-sequential writes to main memory, each is written independently thereby causing more write operations than needed, degradating system performance.

Accordingly, a need still exists for an approach which improves system performance by reducing the number of writes to main memory and the number of required write back buffers.

SUMMARY OF THE INVENTION

The shortcomings of the prior art are overcome and additional advantages are provided in accordance with the principles of the present invention through the provision of a method and apparatus for compressing cacheable data stored in a write back buffer.

In accordance with the present invention, a method and apparatus for processing cacheable data elements is provided. Each data element comprises an address component, a data component and a byte enable component. The address component of a first cacheable data element is compared to the address component of a second cacheable data component and when they are equal, the data component of the first cacheable data element and the data component of the second cacheable data element are compressed resulting in a compressed data component.

The first cacheable data element can be stored in a first write back buffer and the second cacheable data element can be stored in a second write back buffer. Data compression can be accomplished by overlaying the data component of the first cacheable data element with the data component of the second cacheable data element.

In another aspect of the invention, the byte enable component of the first cacheable data element is combined with the byte enable component of the second cacheable data element resulting in a combined byte enable component. This combined byte enable component indicates the valid bits of the compressed data component. In a preferred embodiment of the invention, the combined byte enable component is produced from ORing the byte enable component of the first cacheable data element with the byte enable component of the second cacheable data element.

The method and apparatus for processing cacheable data elements in accordance with the present invention affords the advantage of compressing writes for more efficient transfer to main memory as well as reducing the number of transfers and the number of write back buffers needed.

BRIEF DESCRIPTION OF THE DRAWINGS

The subject matter which is regarded as the invention is particularly pointed out and distinctly claimed in the claims at the conclusion of the specification. The invention, however, both as to apparatus and method, may best be understood by reference to the following detailed description taken in conjunction with the accompanying drawings in which:

DETAILED DESCRIPTION OF THE DRAWINGS

Figures 1, 2:
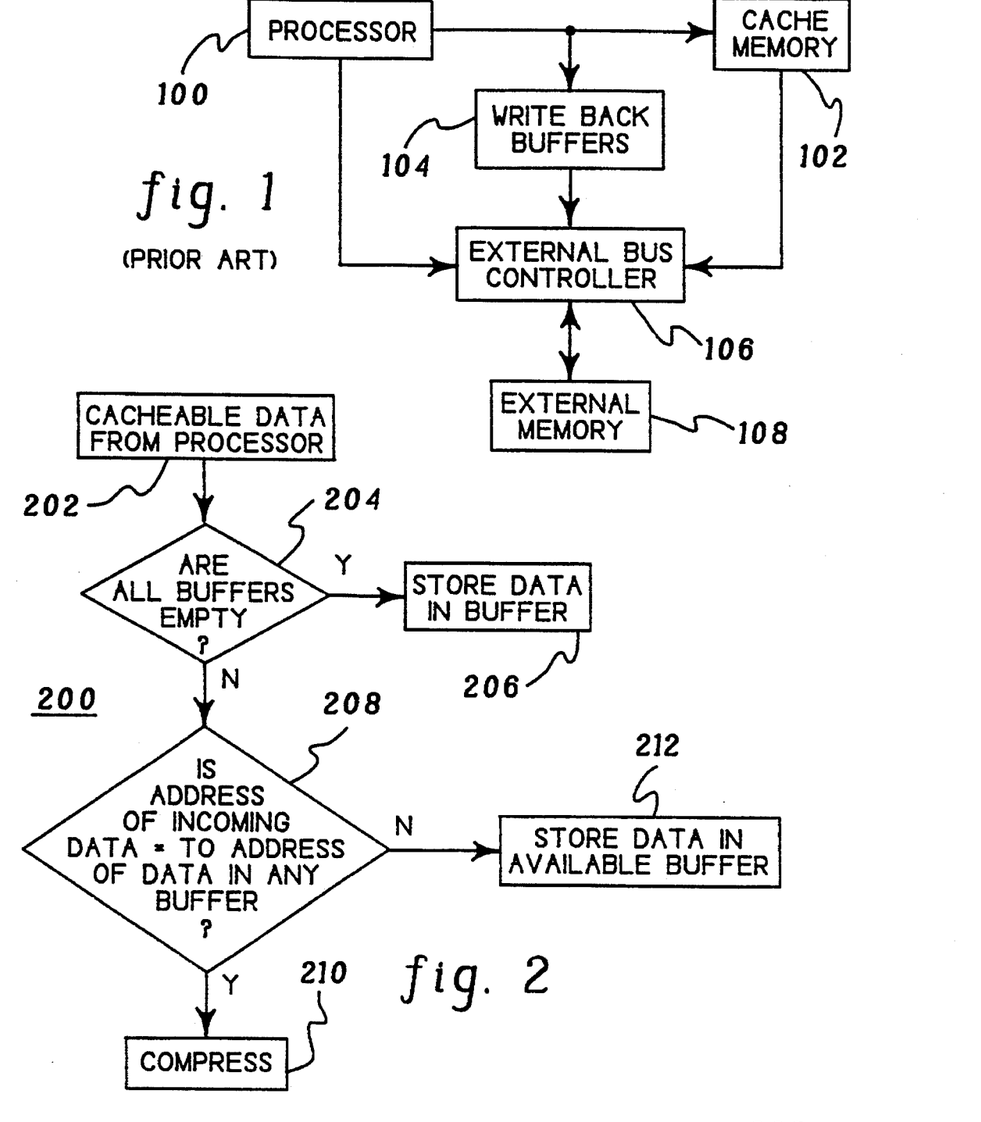
FIG. 1 is a representation of a prior art computer system utilizing a cache memory and write back buffers.
FIG. 2 is a functional block diagram of the write back buffer compression approach of the present invention.

Referring to FIG. 1, a processor (100) is coupled to a cache memory (102), one or more write back buffers (104) and an external bus controller (106). When bus controller (106) is available, processor (100) writes data, including cacheable data elements, to an external memory (108) via bus controller (106). However, when bus controller (106) is busy and thus unable to accept any more data, processor (100) simultaneously writes cacheable data elements to cache memory (102) and write back buffers (104), if they are available. Should the cache memory and write back buffers be unavailable, processor (100) stalls.

Cache memory (102) and write back buffers (104) are further coupled to external bus controller (106), which is coupled to external memory (108). Data stored in cache memory (102) and write back buffers (104) is written to external memory (108) via external bus controller (106). As used herein, external memory (108) refers to any memory other than cache memory.

The number of write back buffers utilized varies with each system. There is a trade-off in the amount of space available for write back buffers and the system performance gained with each additional buffer. Thus, the number of buffers used may be less than desired or needed.

The write back buffer compression method and apparatus of the present invention reduces the number of writes to external memory and the number of write back buffers needed, thereby improving system performance. Write back buffer compression can be used in any system where write back buffers are used, such as within a processor, cache or memory controller design.

As depicted in FIG. 2, in accordance with the write back buffer compression approach of the present invention (200), when a cacheable data element is received from a processor (Step 202 "Cacheable Data From Processor"), the processor determines whether all of the write back buffers are empty (Inquiry 204 "Are All Buffers Empty?"). If all of the buffers are empty, then the cacheable data element is stored in one of the buffers (Step 206 "Store Data In Buffer"). If, however, one or more of the buffers are full, then the processor compares the address of the data coming from the processor to the address of the data stored in the buffers (Inquiry 208 "Is Address Of Incoming Data Equal To Address Of Data In Any Buffer?"). Should the address of the current data be equal to the address of the data in any buffer, then compression is performed (Step 210 "Compress") in a manner explained further below. If, however, none of the addresses are equal, then the data coming from the processor is stored in another available buffer (Step 212 "Store Data In Available Buffer").

Figure 3:
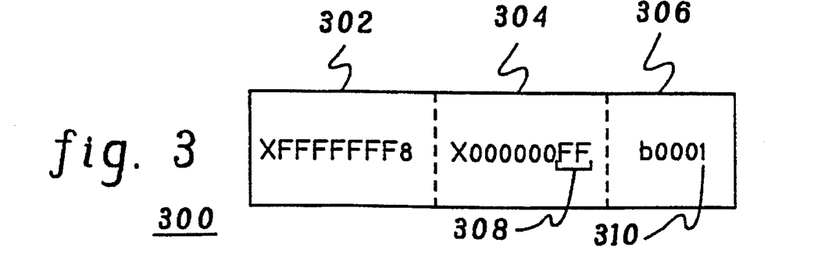
FIG. 3 is a representation of the components of the cacheable data element stored using the write back buffer compression approach of FIG. 2.

As shown in FIG. 3, cacheable data element (300) includes, for example, three components: a 32-bit address component (302), which indicates the address of cacheable data element (300); a 32-bit data component (304), which represents the data portion of cacheable data element (300); and a 4-bit byte enable component (306), which indicates the bytes of data component (304) which represent valid data. For example, if the rightmost 8 bits (308) of data component (304) represent valid data, then the rightmost bit (310) of byte enable component (306) is set high. It should be understood that the number of bits of the address component, data component and byte enable component may vary without departing from the invention. The number of bits depends on the desired or needed size of the write back buffers.

As previously mentioned, cacheable data element (300) may be stored within one or more write back buffers (104). In one specific implementation of the present invention, two write back buffers are utilized in storing cacheable data elements. Each buffer includes, for example, three registers, a 32-bit binary address register, a 32-bit binary data register and a 4-bit binary byte enable register, for accommodating the address component, data component and byte enable component of cacheable data element (300), respectively.

Figure 4:
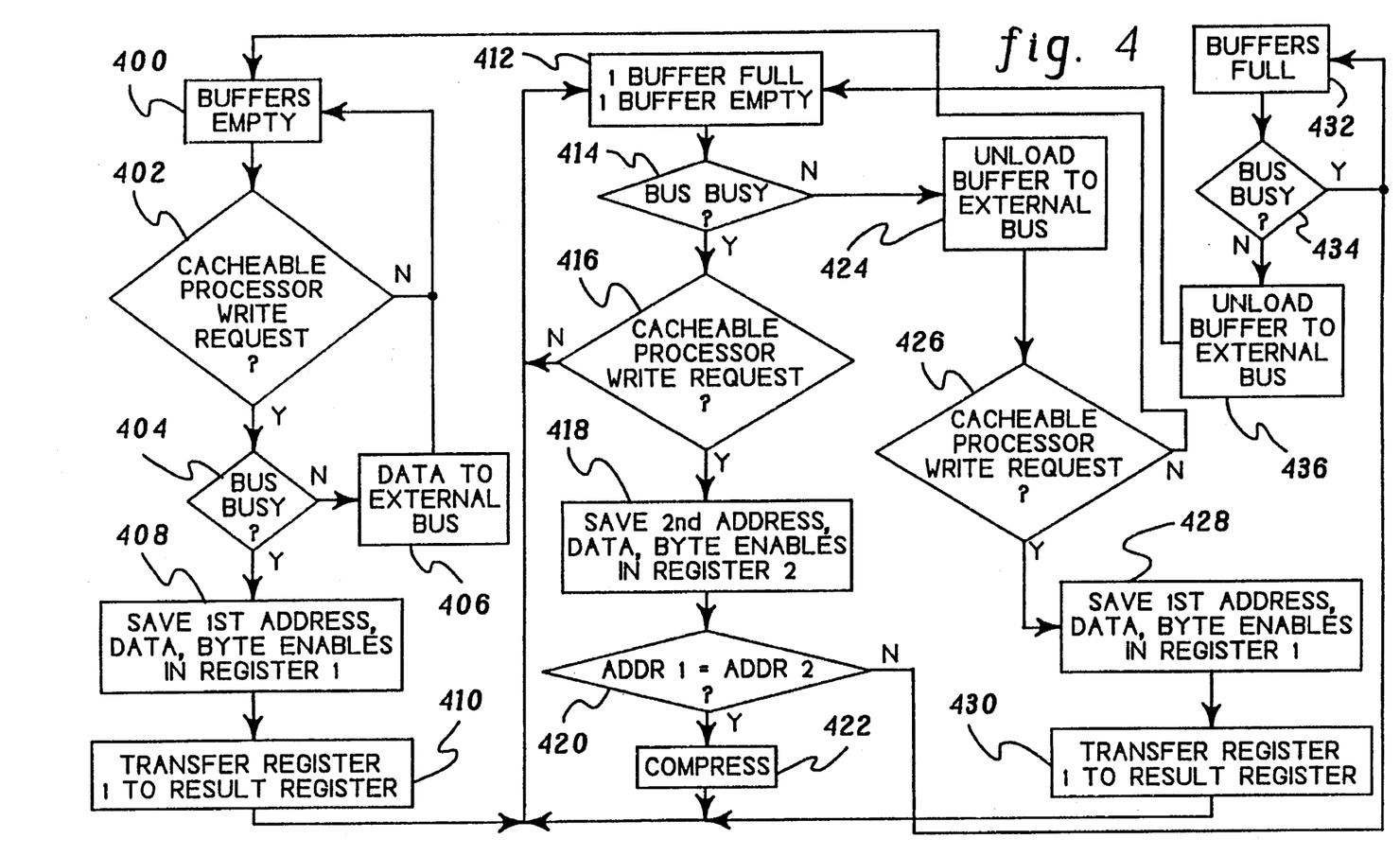
FIG. 4 is a control flow diagram of one specific implementation of the write back buffer compression approach of FIG. 2.
Figure 5:
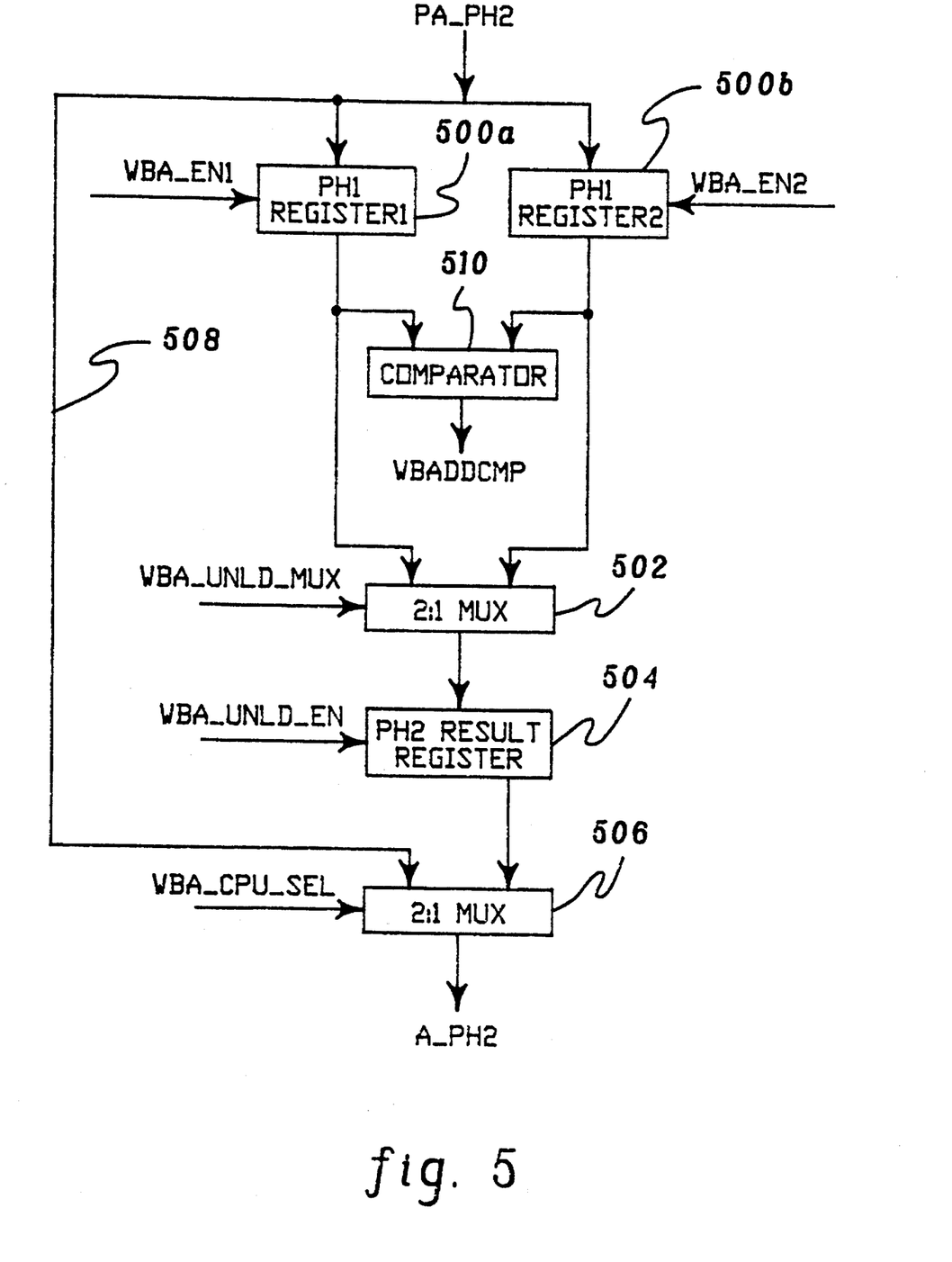
FIG. 5 is a diagram of the flow associated with the address component of the cacheable data element of FIG. 3.
Figure 6:
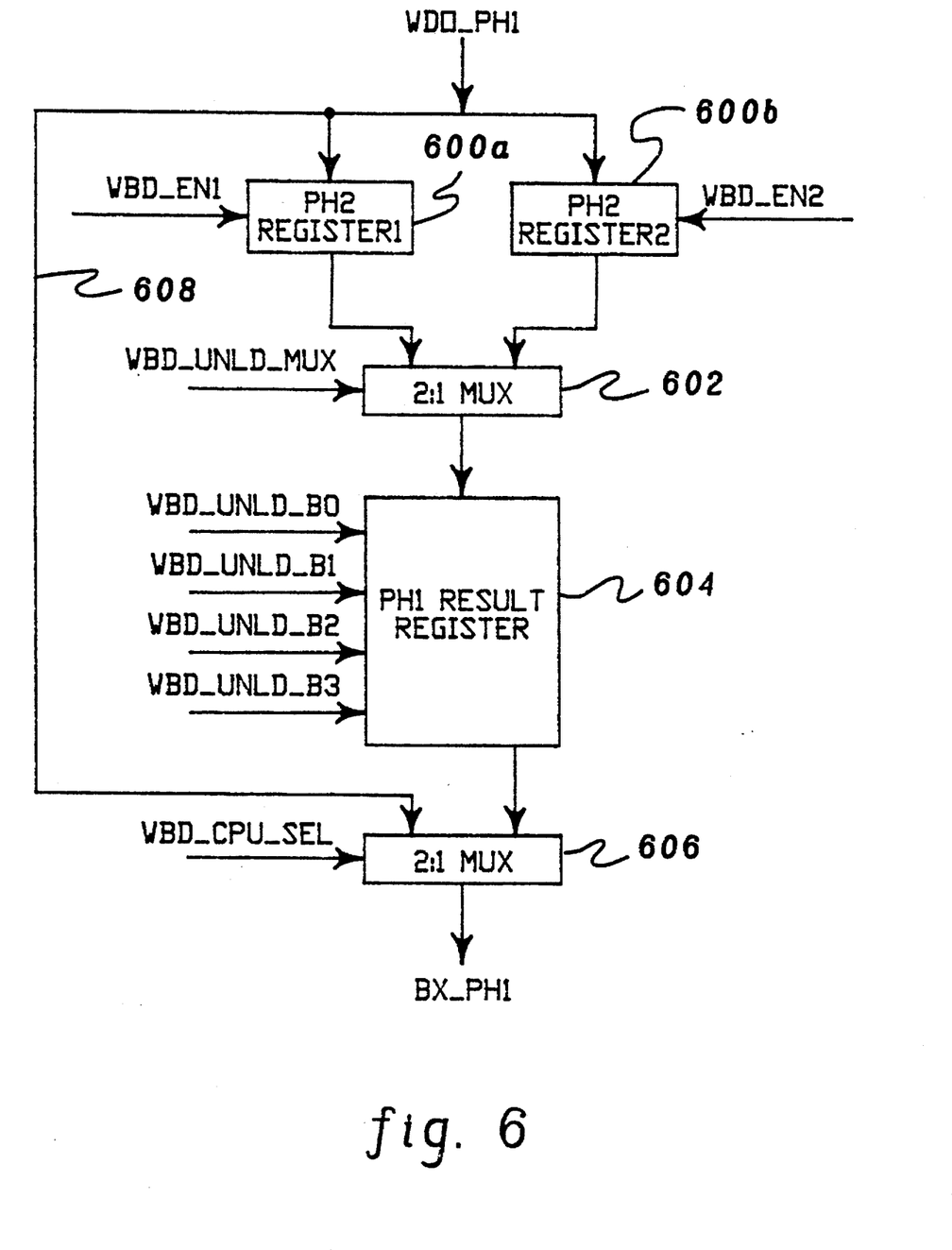
FIG. 6 is a diagram of the flow associated with the data component of the cacheable data element of FIG. 3.
Figure 7:
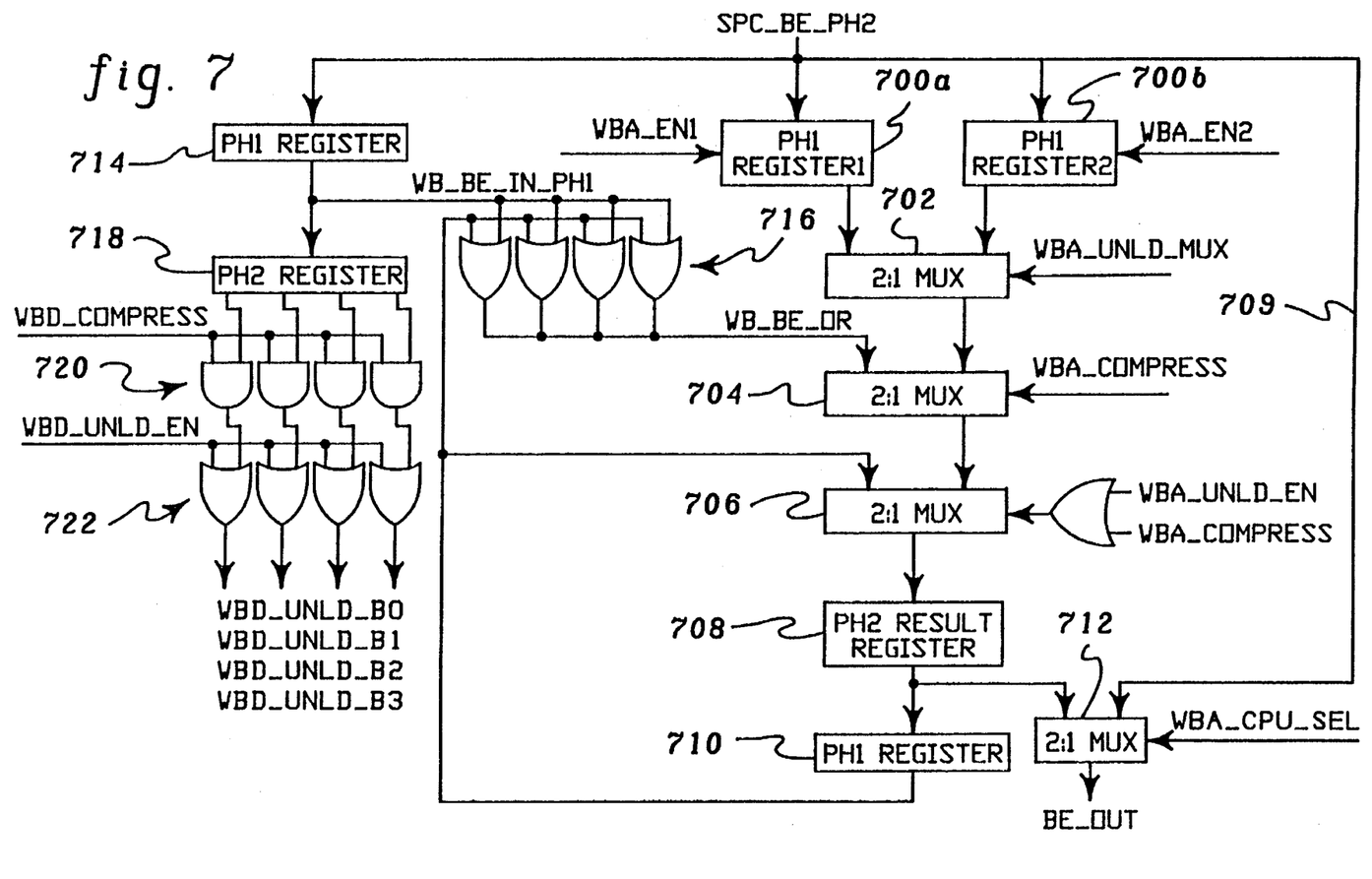
FIG. 7 is a diagram of the flow associated with the byte enable component of the cacheable data element of FIG. 3.

Referring to FIGS. 4–7, the control flow for one specific implementation of the write back buffer compression method and apparatus of the present invention is described in detail. Briefly, FIG. 4 depicts an overview of the control process, while FIGS. 5–7 illustrate in detail the flow associated with address component (302), data component (304) and byte enable component (306), respectively.

As depicted in FIG. 4, the processor determines whether both of the write back buffers are empty (Step 400 "Buffers Empty"), whether one of the buffers is full and one is empty (Step 412 "1 Buffer Full, 1 Buffer Empty") or whether both of the buffers are full (Step 432 "Buffers Full"). In the following example, both buffers are initially empty and, therefore, the discussion begins at Step 400 "Buffers Empty."

Once the processor ascertains that both of the buffers are empty, the processor determines whether a cacheable data element is to be written to external memory (Inquiry 402 "Cacheable Processor Write Request?"). If there is no cacheable data elements to be stored and, therefore, no pending cacheable processor write request, flow returns to Step 400 "Buffers Empty." If, on the other hand, a write request is pending, the processor determines whether the external bus controller is busy (Inquiry 404 "Bus Busy?").

If the bus controller is available and therefore, able to accept data, the cacheable data element is passed to the external bus (Step 406 "Data to External Bus"). Specifically, address component (302), data component (304) and byte enable component (306) of the cacheable data element are passed to the external bus controller, as described below with reference to FIGS. 5–7.

Referring to FIG. 5, in which the control flow for the address component is depicted, a physical address, PA_PH2, of the cacheable data element is directed from the processor via a path (508) to a standard two-to-one multiplexor (506). MUX (506) is coupled to an address result register (504) (to be explained further below). A control signal, WBA_CPU_SEL, enables MUX (506) to select the address, PA_PH2, coming from the processor or the address stored in register (504). In this instance, WBA_CPU_SEL selects PA_PH2 coming from the processor. The output of MUX (506), A_PH2, is then passed to external bus controller (106).

Referring to FIG. 6, the flow of data component (304) of the cacheable data element is explained. A signal, WDO_PH1, representative of the data component is directed via a path (608) to a standard two-to-one MUX (606). MUX (606) is coupled to a data result register (604) (to be explained below). A control signal, WBD_CPU_SEL, enables MUX (606) to select the data signal, WDO_PH1, coming from the processor or the data stored in register (604). In this instance, WBD_CPU_SEL selects WDO_PH1 coming from the processor. The output of MUX (606), BX_PH1, is then passed to external bus controller (106).

Referring now to FIG. 7, the flow of byte enable component (306) of the cacheable data element is depicted. A signal, SPC_BE_PH2, representative of the byte enable component, is directed via a path (709) to a standard two-to-one MUX (712). MUX (712) is coupled to a byte enable result register (708). The control signal, WBA_CPU_SEL, as described above with reference to the address data flow of FIG. 5, is also used to enable MUX (712) to select the byte enable signal, SPC_BE_PH2, coming from the processor or the byte enable stored in register (708). As described above, in this instance, WBA_CPU_SEL selects SPC_BE_PH2 coming from the processor. The output of MUX (712), BE_OUT, is then passed to external bus controller (106). Once the cacheable data element is sent to the external bus controller (Step 406 "Data to External Bus"), flow returns to Step 400 "Buffers Empty".

Referring back to Inquiry 404 "Bus Busy?" (FIG. 4), if, however, bus controller (106) is unavailable and therefore, unable to accept data, the cacheable data element is stored in a first of the write back buffers (Step 408 "Save 1st Address, Data, Byte Enables in Register 1"). Specifically, address component (302), data component (304) and byte enable component (306) are stored in the address register, data register and byte enable register of the first of write back buffers (104). The control flow for each of these components is described below with reference to FIGS. 5–7.

Referring to FIG. 5, in order to store the address component in the address register, the physical address, PA_PH2, of the cacheable data element is clocked into a first address register (500a) setting a control signal, WBA_EN1, high. The clocking of PA_PH2 occurs during phase one of a two-phase non-overlapping clock.

Referring to FIG. 6, a signal, WDO_PH1, representative of the data component is clocked in a first data register (600a) during the second phase of the two-phase clock. A signal, WBD_EN1, is set high during the clocking of WDO_PH1 in data register (600a).

Referring to FIG. 7, in order to store the byte enable component in the byte enable register, the signal, SPC_BE_PH2, is clocked in a first byte enable register (700a) during the first phase of the two-phase clock. The signal, WBA_EN1, as described above with reference to the address data flow of FIG. 5, is also used to indicate that the byte enable component has been clocked into register (700a).

Referring again to FIG. 4, once address component (302), data component (304) and byte enable component (306) are stored in their respective registers, the value in each register is transferred to a corresponding result register (Step 410 "Transfer Register 1 to Result Register"). Specifically, the address stored in register (500a) (FIG. 5) is passed to address result register (504) via a conventional two-to-one MUX (502). MUX (502) is coupled to first address register (500a) as well as a second address register (500b). As is known, MUX (502) selects the address stored in register (500a) or register (500b) depending on the value of a control signal, for instance, WBA_UNLD_MUX. At this point in the flow control, only address register (500a) contains a value and therefore, MUX (502) selects the address value stored in register (500a). The output of MUX (502) is passed to address result register (504) during phase two of the clock cycle and a signal, WBA_UNLD_EN, is set high indicating that an address is now located in register (504).

Referring to FIG. 6, the data stored in register (600a) is transferred to the data result register (604) via a conventional two-to-one MUX (602). MUX (602) is coupled to first data register (600a) and a second data register (600b). MUX (602) selects data from either of the data registers depending on the value of a control signal, WBD_UNLD_MUX. Since data is only stored in data register (600a), at this instance, MUX (602) selects the data value stored in register (600a) and passes it to result register (604). When the data is stored in result register (604), a plurality of control signals, WBD_UNLD_B0, WBD_UNLD_B1, WBD_UNLD_B2 and WBD_UNLD_B3, indicative of valid bytes of data are set high.

Referring to FIG. 7, the byte enable component stored in register (700a) is transferred to byte enable result register (708) via a series of standard two-to-one multiplexors (to be explained below). Coupled to register (700a) and a second byte enable register (700b) is a two-to-one MUX (702), the output which is coupled to another two-to-one MUX (704). MUX (704) is further coupled to a two-to-one MUX (706) which is coupled to result register (708). Similar to MUX (502) and MUX (602) described above, MUXES (702), (704) and (706) select one of their two inputs depending on the value of a control signal. For instance, MUX (702) selects the value stored in register (700a) or register (700b) depending on the value of control signal, WBA_UNLD_MUX. As described previously, since a byte enable value is only stored in register (700a), control signal WBA_UNLD_MUX directs MUX (702) to select the value stored in register (700a). This byte enable value is then transferred to MUX (704) under direction of control signal WBA_COMPRESS. Likewise, in this example, MUX (706) selects the byte enable value from MUX (704). Next, the byte enable value is stored in result register (708).

In this implementation, since result register (708) is not gated, a hold latch, namely register (710), coupled to result register (708), is added in order to ensure that the correct value is maintained in byte enable result register (708). As depicted in FIG. 7, this is accomplished by passing the value stored in register (708) to the phase one register (710) and then to MUX (706). MUX (706) then selects this value and places it back into result register (708) thereby ensuring that the correct value is maintained in register (708).

Referring once again to FIG. 4, since the address component, data component and byte enable components have been stored in a first of the write back buffers and the contents of the first registers have been passed to the corresponding result registers, flow passes to Step 412 "One Buffer Full, One Buffer Empty." Next, the processor determines whether the bus controller is available (Inquiry 414 "Bus Busy?"). If the bus controller is not busy, the cacheable data element stored in the first of the write back buffers is unloaded to the external bus controller (Step 424 "Unload Buffer to External Bus"). Specifically, each of the components of the cacheable data element, i.e. the address component, data component and byte enable component, is passed to external memory (108) via external bus controller (106), as described below with reference to FIGS. 5–7.

Referring to FIG. 5, the address stored in address result register (504) is transferred to the external bus controller via MUX (506). As previously mentioned, MUX (506) is coupled to result register (504) and processor (100). Control signal, WBA_CPU_SEL, enables MUX (506) to select the address stored in result register (504). Once selected, this address, A_PH2, is passed to the external bus controller.

Similar to the manner in which the address stored in register (504) is transferred to the external bus controller, the data stored in data result register (604) (FIG. 6) is passed to the external bus controller. MUX (606) which as previously described, is coupled to result register (604) selects the data stored in register (604) and passes this data, BX_PH1, to the external bus controller.

Similarly, the byte enables stored in byte enable result register (708) (FIG. 7) are passed to the external bus controller via MUX (712).

After the cacheable data element stored in the first of buffers (104) is unloaded, the processor determines whether there is a pending cacheable processor write request (Inquiry 426 "Cacheable Processor Write Request?"). If no pending cacheable write request exists, flow returns to Step 400 "Buffers Empty." If, however, there is a pending write request, then the cacheable data element is once again stored in the first of the write back buffers (Step 428 "Save First Address, Data, Byte Enables in Register 1") and subsequently transferred to the appropriate result registers (Step 430 "Transfer Register 1 to Result Register"), as described above with reference to Steps 408 and 410. At this point, flow returns to Step 412 "One Buffer Full, One Buffer Empty."

Referring once again to Inquiry 414 "Bus Busy?", if the bus controller is unavailable and therefore unable to unload the contents of the first of the write back buffers to the external bus, the processor determines whether there is a pending cacheable processor write request (Inquiry 416 "Cacheable Processor Write Request?"). If there is no cacheable data elements to be written and therefore no pending write request, flow returns once again to instruction 412 "One Buffer Full, One Buffer Empty." If, however, there is a pending cacheable processor write request, then the cacheable data element is stored in a second of the write back buffers (Step 418 "Save 2nd Address, Data, Byte Enables in Register 2"). The second of the write back buffers also includes, for example, three registers, a 32-bit address register, a 32-bit data register and a 4-bit byte enable register.

Referring once again to FIGS. 5 through 7, the manner in which the cacheable data element is stored within the second of the write back buffers is described in detail.

Referring to FIG. 5, in order to store the address component in the second of address registers (500b), the physical address, PA_PH2, of the cacheable data element is clocked into the second address register (500b) setting a control signal, WBA_EN2, high. The clocking of PA_PH2 occurs during phase one of the two phase non-overlapping clock.

Referring to FIG. 6, the data signal, WDO_PH1, representative of the current data component is clocked into the second data register (600b) during the second phase of the two phase clock. A signal WBD_EN2, is set high during the clocking of WDO_PH1 in data register (600b).

Referring now to FIG. 7, the signal SPC_BE_PH2, representative of the byte enable component is clocked into the second of byte enable registers (700b) during the first phase of the two phase clock. The signal WBA_EN2, as described above with reference to the address flow for FIG. 5, is also used to indicate that the byte enable component has been clocked into register (700b).

Referring back to FIG. 4, once the cacheable data element is stored in the second write back buffer, the processor determines whether the address component stored within the first write back buffer is equal to the address component stored within the second write back buffer (Inquiry 420 "Addr 1=Addr 2?"). Specifically, once an address component is stored in address register (500b), an asynchronous circuit, comparator (510) (FIG. 5), is used to compare the address stored in the first of address registers (500a) with the address stored in the second of address registers (500b). If the addresses are equal, a signal, WBADDCMP, is set high (to be explained further below). If the addresses are not equal, then flow passes to Step 432 "Buffers Full." When the buffers are full and there is a pending cacheable processor write request, the processor stalls.

In addition to the above, when both buffers are full, the processor determines whether the bus controller is busy (Inquiry 434 "Bus Busy?"). If the bus controller is unavailable, flow returns to Step 432 "Buffers Full." If, however, the bus controller is not busy, then flow passes to Step 436 "Unload Buffer to External Bus." This is accomplished in the same manner as previously described with reference to Step 424 "Unload Buffer to External Bus". After the cacheable data element is unloaded to the external bus controller, flow returns once again to Step 412 "One Buffer Full, One Buffer Empty."

Returning again to Inquiry 420 "Addr 1=Addr 2?", if the addresses are equal, compression of the data component and byte enable components takes place (Step 422 "Compress"). The details of compression are described with reference to FIG. 7.

As depicted in FIG. 7, a third byte enable register (714) is used in storing the byte enable component coming from the processor. Unlike byte enable register (700a) and byte enable register (700b), register (714) is a non-gated register. Therefore, whenever a byte enable component comes from the processor, it is stored in byte enable register (714). This occurs during phase one of the two phase clock. Since, at this point in the flow control, the most current cacheable data element has been stored in the second of the write back buffers, non-gated register (714) contains the same byte enable as stored in register (700b).

Register (714) is coupled to a plurality of OR gates (716) and a phase two register (718). For compression, the flow is focused on the path from register (714) to OR gates (716). As shown, in one implementation, there are four OR gates, one for each of the four binary bits comprising the byte enable component. Each binary bit of the byte enable component stored in register (714) is OR'd with the bits of the byte enable component stored in register (710) yielding a new byte enable value represented by WB_BE_OR. For instance, if the value stored in register (714) is 0001 and the value stored in register (710) is 0010, then after the OR function, the new byte enable component value is 0011. This new value indicates that the rightmost 16 bits of the data component contain valid data.

As depicted in FIG. 7, the output of OR gates (716), WB_BE_OR, is an input to two-to-one MUX (704). MUX (704) selects the derived compressed byte enable value, WB_BE_OR, when a control signal WBA_COMPRESS is set high indicating that compression is to take place. That is, WBA_COMPRESS is set high when the processor determines that the addresses stored in address register (500a) and address register (500b) are equal and one of the write back buffers is full and one is empty. Since, at this time, the addresses are equal and only one buffer is full, WBA_COMPRESS is set high and MUX (704) selects WB_BE_OR.

As shown and described above, MUX (704) is further coupled to MUX (706). MUX (706) selects the derived byte enable, WB_BE_OR, when a high value results from the AND of WBA_UNLD_EN and WBA_COMPRESS. In other words, a high value, (a binary "1"), results when compression takes place. Since, at this instance, WBA_COMPRESS is high indicating compression is to take place and WBA_UNLD_EN is high (as described above), MUX (706) selects WB_BE_OR from MUX (704). The output of MUX (706) is then passed to and stored in the phase two result register (708).

As previously mentioned, when compression is to be performed, the byte enable bits are compressed as described above as well as the data bits, explained below. Summarily, data compression is accomplished by utilizing the following data byte enables, WBD_UNLD_B0, WBD_UNLD_B1, WBD_UNLD_B2 and WBD_UNLD_B3 (see FIG. 7). In detail, data compression is accomplished in the manner described below.

Referring to FIG. 7, as previously mentioned, non-gated register (714) receives a copy of the current byte enable component during phase one of the two-phase clock cycle. During phase two, the byte enable component stored in register (714) is passed to a phase two register (718), which is coupled to register (714). Similar to register (714), register (718) is also non-gated. Register (718) is further coupled to a plurality of two-input AND gates (720). In one embodiment, there are four AND gates, one for each binary bit of the 4-bit byte enable component. One input of the two-input AND gates is the output from register (718) and the other input is a signal, WBD_COMPRESS, which is the phase one latch output of WBA_COMPRESS. WBD_COMPRESS is set high when WBA_COMPRESS goes high, as described previously.

Each output of AND gates (720) is an input to a plurality of two-input OR gates (722). Once again, in one embodiment, there are four OR gates, one for each bit of the byte enable component. The second input of OR gates (722) is a signal, WBD_UNLD_EN, which is off during compression. Therefore, the results of the four OR gates, namely WBD_UNLD_B0, WBD_UNLD_B1, WBD_UNLD_B2 and WBD_UNLD_B3, reflect the value of the byte enable component as it is stored in register (714). WBD_UNLD_B0, WBD_UNLD_B1, WBD_UNLD_B2, and WBD_UNLD_B3 are used in overlaying the valid bits of data stored in data register (600b) onto the data currently stored in data result register (604).

In other words, as shown in Table 1 below, if result register (604) contains a data value of 000000FF and register (600b) contains a value of 0000FF00, then after compression, the resulting data component stored in register (604) is 0000FFFF.

TABLE 1

| Register | Data | Byte Enable |
|---|---|---|
| Before Compression: | | |
| 600b | 0000FF00 | 0010 |
| 604 | 000000FF | 0001 |
| | (Byte) 3 2 1 0 | |
| After Compression: | | |
| 604 | 0000FFFF | 0011 |

As depicted in Table 1, since register (600b) contains data 0000FF00, the byte enable component equals 0010 which indicates that the valid bits of data in register (600b) are located at byte 1 of the data component. Therefore, byte 1 in register (600b) overlays byte 1 in register (604) yielding 0000FFFF in register (604) after compression..

After the compression of the byte enables and data bits is accomplished, the flow returns to Step 412 "1 Buffer Full, 1 Buffer Empty" (FIG. 4).

As can be seen from the foregoing, an apparatus and method for compressing cacheable data stored in write back buffers is disclosed. The write back buffer compression approach of the present invention advantageously reduces the number of write back buffers needed and the frequency with which data is written to the external memory.

Although a preferred embodiment has been depicted and described in detail herein, it will be apparent to those skilled in the relevant art that various modifications, additions, substitutions and the like can be made without departing from the spirit of the invention, and these are therefore considered to be within the scope of the invention as defined by the appended claims.

What is claimed is:

1. A method for processing cached data elements, each cached data element comprising an address component and a data component, said method comprising:

comparing an address component of a first cached data element to an address component of a second cached data element and indicating an equality when the address component of said first cached data element and the address component of said second cached data element are equal; and overlaying one or more bits of a data component of said first cached data element with one or more bits of a data component of said second cached data element resulting in a compressed data component when said comparing step indicates said equality.

2. The method of claim 1, further including the step of determining valid bits of said compressed data component.

3. The method of claim 2, wherein said determining step includes combining a byte enable component of said first cached data element and a byte enable component of said second cached data element resulting in a combined byte enable component when said comparing step indicates said equality.

4. The method of claim 3, wherein the byte enable component of said first cached data element, the byte enable component of said second cached data element, and said combined byte enable component are all of equal length.

5. The method of claim 3, wherein said combining step comprises ORing the byte enable component of said first cached data element with the byte enable component of said second cached data element.

6. The method of claim 1, wherein a byte enable component of said second cached data element indicates which of said one or more bits of said data component of said second cached data element are valid and wherein said overlaying step comprises replacing said one or more bits of said data component of said first cached data element with the valid bits, said one or more bits to be replaced corresponding in position to said valid bits.

7. A method for compressing cached data elements, each element being stored in a write back buffer and each comprising an address component, a data component and a byte enable component, said method comprising:

comparing an address component of a first cached data element stored in a first write back buffer to an address component of a second cached data element stored in a second write back buffer and indicating an equality when the address component of said first cached data element and the address component of said second cached data element are equal;

overlaying one or more bits of a data component of said first cached data element stored in said first write back buffer with one or more bits of a data component of said second cached data element stored in said second write back buffer resulting in a compressed data component when said comparing step indicates said equality; and combining a byte enable component of said first cached data element stored in said first write back buffer and a byte enable component of said second cached data element stored in said second write back buffer resulting in a combined byte enable component when said comparing step indicates said equality, wherein said combined byte enable component indicates valid bits of said compressed data component.

8. The method of claim 7, wherein a byte enable component of said second cached data element indicates which of said one or more bits of said data component of said second cached data element are valid and wherein said overlaying step comprises replacing said one or more bits of said data component of said first cached data element with the valid bits, said one or more bits to be replaced corresponding in position to said valid bits.

9. An apparatus for processing cached data elements, each element comprising an address component and a data component, said apparatus comprising:
   means for comparing an address component of a first cached data element to an address component of a second cached data element and indicating an equality when the address component of said first cached data element and the address component of said second cached data element are equal; and
   means for overlaying one or more bits of a data component of said first cached data element with one or more bits of a data component of said second cached data element resulting in a compressed data component when said comparing means indicates said equality.

10. The apparatus of claim 9, further including means for determining valid bits of said compressed data component.

11. The apparatus of claim 10, wherein said determining means includes means for combining a byte enable component of said first cached data element and a byte enable component of said second cached data element resulting in a combined byte enable component when said comparing means indicates said equality.

12. The apparatus of claim 11, wherein the byte enable component of said first cached data element, the byte enable component of said second cached data element, and said combined byte enable component are all of equal length.

13. The apparatus of claim 11, wherein said combining means comprises means for ORing the byte enable component of said first cached data element with the byte enable component of said second cached data element.

14. The apparatus of claim 9, wherein a byte enable component of said second cached data element indicates which of said one or more bits of said data component of said second cached data element are valid and wherein said overlaying means comprises means for replacing said one or more bits of said data component of said first cached data element with the valid bits, said one or more bits to be replaced corresponding in position to said valid bits.

15. An apparatus for compressing cached data elements, each element being stored in a write back buffer and each element comprising an address component, a data component and a byte enable component, said apparatus comprising:
   means for comparing an address component of a first cached data element stored in a first write back buffer to an address component of a second cached data element stored in a second write back buffer and indicating an equality when the address component of said first cached data element and the address component of said second cached data element are equal;
   means for overlaying one or more bits of a data component of said first cached data element with one or more bits of a data component of said second cached data element resulting in a compressed data component when said comparing means indicates said equality; and
   means for combining a byte enable component of said first cached data element and a byte enable component of said second cached data element resulting in a combined byte enable component when said comparing means indicates said equality, wherein said combined byte enable component indicates valid bits of said compressed data component.

16. The apparatus of claim 15, wherein a byte enable component of said second cached data element indicates which of said one or more bits of said data component of said second cached data element are valid and wherein said overlaying means comprises means for replacing said one or more bits of said data component of said first cached data element with the valid bits, said one or more bits to be replaced corresponding in position to said valid bits.

17. An apparatus for compressing cached data elements, each element comprising an address component, a data component and a byte enable component, said apparatus comprising:
   a processor;
   a first write back buffer coupled to said processor, said first write back buffer storing a first cached data element received from said processor;
   means for comparing an address component of said first cached data element to an address component of a second cached data element received from said processor and indicating an equality when the address component of said first cached data element and the address component of said second cached data element are equal;
   means for overlaying one or more bits of a data component of said first cached data element with one or more bits of a data component of said second cached data element resulting in a compressed data component when said comparing means indicates said equality; and
   means for combining a byte enable component of said first cached data element and a byte enable component of said second cached data element resulting in a combined byte enable component when said comparing means indicates said equality.

18. The apparatus of claim 17, wherein said combining means includes means for ORing the byte enable component of said first cached data element with the byte enable component of said second cached data element.

19. The apparatus of claim 17, further comprising a data result register for storing said compressed data component.

20. The apparatus of claim 17, further comprising a byte enable result register for storing said combined byte enable component.

21. The apparatus of claim 17, wherein said first write back buffer includes a first address register for storing the address component of said first cached data element, a first data register for storing the data component of said first cached data element and a first byte enable register for storing the byte enable component of said first cached data element.

22. The apparatus of claim 17, further comprising a second write back buffer coupled to said processor, said second write back buffer storing said second address component, said second data component and said second byte enable component received from said processor.

23. The apparatus of claim 22, wherein said second write back buffer includes a second address register for storing the address component of said second cached data element, a second data register for storing the data component of said second cached data element and a second byte enable register for storing the byte enable component of said second cached data element.

24. The apparatus of claim 17, wherein a byte enable component of said second cached data element indicates which of said one or more bits of said data component of said second cached data element are valid and wherein said overlaying means comprises means for replacing said one or more bits of said data component of said first cached data element with the valid bits, said one or more bits to be replaced corresponding in position to said valid bits.

25. A method for compressing cached data elements being transferred from a processor to one or more write back buffers, each element comprising an address component, a data component and a byte enable component, said method comprising:

receiving a cached data element from said processor;

determining if all of said write back buffers are empty;

when all of said write back buffers are determined to be empty, storing said cached data element in a write back buffer;

when any of said write back buffers are determined not to be empty, comparing an address component of said cached data element received from said processor to an address component of a cached data element stored in said write back buffers and indicating an equality when the compared address components are equal; and overlaying one or more bits of a data component of said cached data element stored in said write back buffers with one or more bits of a data component of said cached data element received from said processor resulting in a compressed data component when said comparing step indicates said equality.

26. The method of claim 25, further including the step of combining a byte enable component of said cached data element stored in said write back buffers and a byte enable component of said cached data element received from said processor resulting in a combined byte enable component when said comparing step indicates said equality, wherein said combined byte enable component indicates valid bits of said compressed data component.

27. The method of claim 25, wherein a byte enable component of said second cached data element indicates which of said one or more bits of said data component of said second cached data element are valid and wherein said overlaying step comprises replacing said one or more bits of said data component of said first cached data element with the valid bits, said one or more bits to be replaced corresponding in position to said valid bits.

* * * * *

UNITED STATES PATENT AND TRADEMARK OFFICE
CERTIFICATE OF CORRECTION

PATENT NO. : 5,459,849
DATED : October 17, 1995
INVENTOR(S) : Bergkvist, Jr. et al.

It is certified that error appears in the above-indentified patent and that said Letters Patent is hereby corrected as shown below:

Title page, item [54] delete "CACHEABLE" and replace with --CACHED--.
" " item [75] delete "John J. Bergkvist, Jr.; Michael J. Peters, both of Underhill; Daniel M. Wronski, Essex Junction, all of Vt." and replace with --John J. Bergkvist, Jr., Williston, VT; Michael J. Peters, Round Rock, TX; Daniel M. Wronski, Essex Junction, VT.--

Claim 1, Col. 10:
    Line 8, delete "comparing" and replace with --a step of comparing--.
    Line 14, delete "overlaying" and replace with --a step of overlaying--.
    Line 14, delete "of a data" and replace with --within a data--.
    Line 15, delete "of a data" and replace with --within a data--.
    Line 18, after "equality" add --, said overlaying including using a byte enable to detect the one or more bits within said data component of said second data element--.

Claim 2, Col. 10:
    Line 19, delete "the" and replace with --a--.

Signed and Sealed this

Second Day of April, 1996

Attest:

BRUCE LEHMAN

Attesting Officer    Commissioner of Patents and Trademarks